United States Patent [19]
Ito et al.

[11] Patent Number: 5,636,895
[45] Date of Patent: Jun. 10, 1997

[54] SEAL STRUCTURE FOR WEATHER STRIP

[75] Inventors: Masaru Ito; Katsumi Kitayama, both of Aichi, Japan

[73] Assignee: Toyoda Gosei Co., Ltd., Nishikasugai-gun, Japan

[21] Appl. No.: 673,464

[22] Filed: Jul. 1, 1996

Related U.S. Application Data

[63] Continuation of Ser. No. 560,471, Nov. 17, 1995, abandoned, which is a continuation of Ser. No. 141,577, Oct. 27, 1993, abandoned.

[30] Foreign Application Priority Data

Oct. 27, 1992 [JP] Japan .................... 4-289105
Oct. 27, 1992 [JP] Japan .................... 4-289106

[51] Int. Cl.$^6$ ........................................ B60J 1/10
[52] U.S. Cl. .......................... 296/146.9; 49/479.1
[58] Field of Search .................. 296/196.9; 49/479.1

[56] References Cited

U.S. PATENT DOCUMENTS

| | | | |
|---|---|---|---|
| 4,549,761 | 10/1985 | Lee et al. | 296/146.9 X |
| 4,607,879 | 8/1986 | Mori et al. | 296/146.9 X |
| 5,149,169 | 9/1992 | Nozaki | 296/146.9 X |

FOREIGN PATENT DOCUMENTS

| | | | |
|---|---|---|---|
| 54-031622 | 8/1979 | Japan . | |
| 55-065209 | 10/1980 | Japan . | |
| 357110524 | 7/1982 | Japan | 296/146.9 |
| 61-031877 | 9/1982 | Japan . | |
| 2259730 | 3/1993 | United Kingdom | 296/146.9 |
| 94025302 | 11/1994 | WIPO | 296/146.9 |

*Primary Examiner*—Joseph D. Pape
*Attorney, Agent, or Firm*—Cushman Darby & Cushman Intellectual Property Group of Pillsbury Madison & Sutro LLP

[57] ABSTRACT

A seal comprising an elastic seal member for sealing a gap between an automobile weather strip and a portion of the automobile on which the weather strip is mounted. In such a seal, the elastic seal member is formed from a foamable elastic sealant.

7 Claims, 5 Drawing Sheets

SEAL STRUCTURE FOR WEATHER STRIP

This is a continuation of application Ser. No. 08/560,471, filed on Nov. 17, 1995, which was abandoned upon the filing hereof, which, in turn, is a continuation of application Ser. No. 08/141,577, filed Oct. 27, 1993, now abandoned.

BACKGROUND OF THE INVENTION

This invention has priority rights based on Japanese Patent Application Nos. 4-289105 and 4-289106, filed Oct. 27, 1992, the contents of which are hereby incorporated by reference.

The invention relates to a structure for sealing a gap between confronting surfaces of a weather strip and a portion of the automobile body on which the weather strip is mounted. More particularly, the invention relates to an elastic seal member as well as to a method of forming such elastic seal member.

As used herein, the term "weather strip" refers to the portion of an automobile which is attached to closure portions such as hoods, doors, and sun roofs, and which prevents rain, wind, dust, sound, cold and hot air from entering the automobile. The term can include glass runs and the like.

In addition, the invention also relates to a trim having a U-shaped section with confronting clamp lips formed therein and having an adhesive seal band formed by charging a sealant into an inner groove thereof.

The term "trim" can also be called a "welt" and designates not only an integral trim body, but also a trim portion which forms the mounting base of a weather strip.

While the seal structure for a weather strip is described by an example of a corner portion C1 (see FIG. 2) located at a joint between a door sash 3 and a vertical frame 5 (see FIG. 1) for a mirror bracket in a door glass run 1 of a front door D1, the seal structure of the invention is not limited to such an example.

Figure 2:
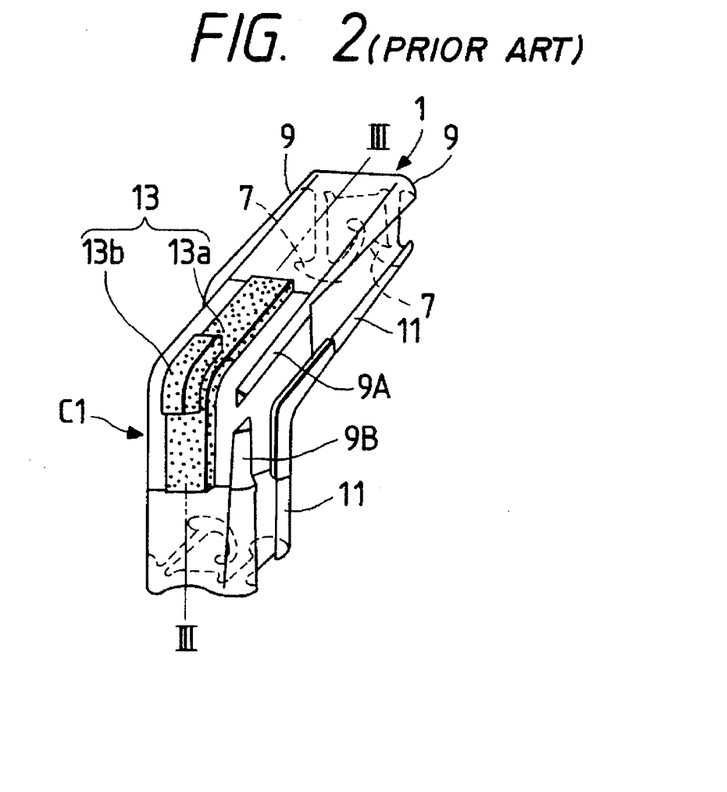
FIG. 2 is an exemplary conventional seal structure for a weather strip (glass run) at a corner portion.

A portion of a glass run 1 is as shown in FIG. 2. A pair of bent seal lips 7, directed toward a bottom portion, are arranged inside the glass run. On both outer sides of the bottom portion are seal fins 9 serving also as members for holding the door sash 3. The bent seal lips 7 abut against both surfaces of a glass pane G, and the seal fins 9 abut against the groove bottom portion of the door sash 3, so that their sealing function can be performed.

The corner portion C1 is fabricated by molding so that the linear portions 11, which are formed by cutting an extruded product, are connected to one another in generally perpendicular relation.

As can be seen, extensions 9A, 9B of the seal fins 9 are formed on the corner portion C1. Since it is difficult to make the extension 9A into a fin-like form by conventional molding technology, the extension 9A is made rib-like, which is a shape which does not flexibly deform easily. Therefore, flexibility relative to the groove bottom portion of the door sash 3 is inadequate, thereby causing the rib-like extension 9A to have inferior sealability characteristics.

Figure 3:
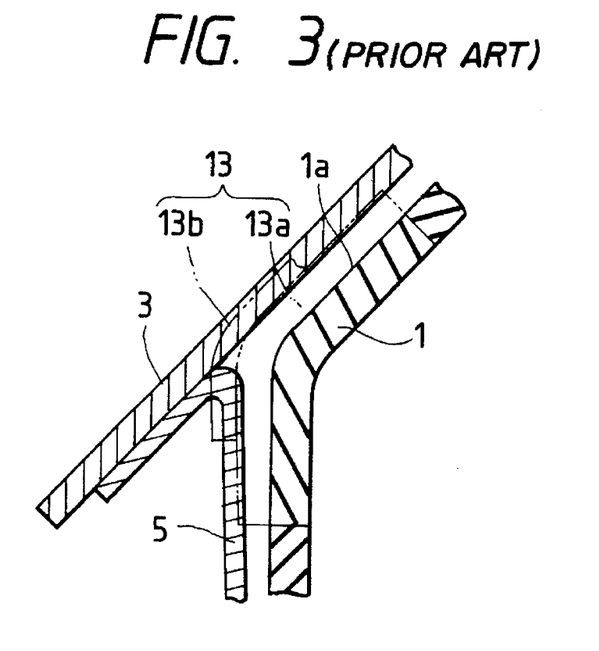
FIG. 3 is a schematic sectional view taken along line 3—3 of FIG. 2 for showing a state in which a door sash and a glass run are put together.

As can be discerned from FIGS. 2 and 3, the height of the gap formed between the door sash 3 and the vertical frame 5, i.e., between the metal plate portion of the automobile body and the bottom portion 1A of the glass run 1 must be larger in the middle of the corner portion C1 as compared with other locations. Therefore, to increase sealability, a seal structure has been proposed, which not only utilizes a first elastic seal member 13a bonded along almost the entire length of the corner portion C1, but also a second elastic seal member 13b that is shorter than the first elastic member. The two layers of the elastic seal members 13a and 13b are formed in the middle of the corner portion (see Japanese Utility Model Unexamined Publication No. 29420/1992).

A number of problems with this seal structure exist. For example, since a rather abrupt step is formed between the first elastic seal member 13a and the second elastic seal member 13b in the above-mentioned seal structure, its sealability becomes inadequate when a higher degree of sealability is required.

Furthermore, bonding of the elastic seal members 13a and 13b, which are made of a sponge sheet, involves a time-consuming manual operation which requires both hands with the glass run 1 fixed on a jig. In addition, since two layers of seal material must be used, the number of process steps is increased.

Figure 8:
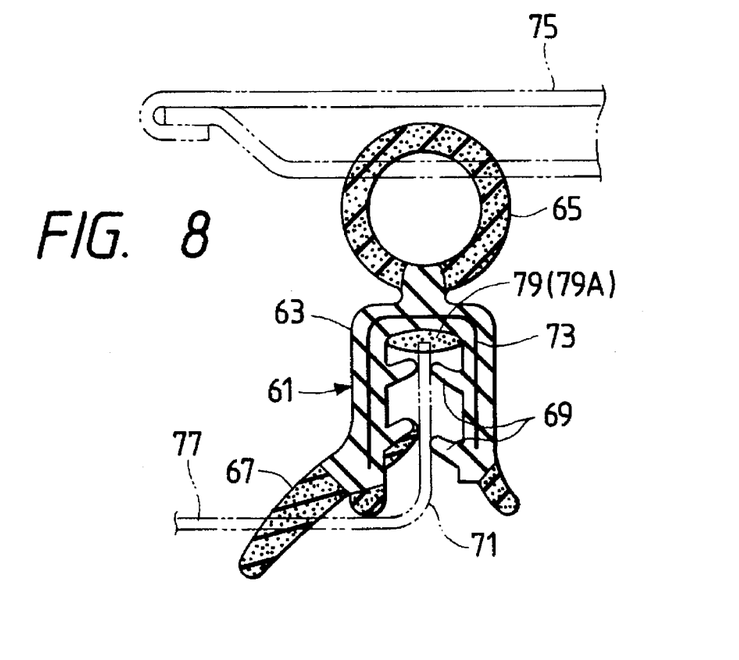
FIG. 8 is a sectional view showing an exemplary weather strip for a trunk to which the present invention is applied.

Another example of a weather strip to which this invention relates is shown in FIG. 8 and will now be described. Of course, the application of the invention is not limited to the embodiment shown.

A weather strip 1 includes: an inverted U-shaped trim portion 63, a hollow seal portion 65 formed on the apex of the trim portion 63, and a fin seal portion 67 formed on the side surface of the trim portion 63 on the outer side of an automobile. The inverted U-shaped trim portion 63 is made from rubber and has at least a pair of confronting clamp lips 69 (two pairs in FIG. 8). A metal insert 73 is embedded in trim portion 63 and maintains the clamping force thereof against automobile body flange 71. The hollow seal portion 65 and the fin seal portion 67 are made of sponge rubber in order to provide flexibility (an important factor of sealability) relative to a closure or lid portion 75 forming part of a door or trunk, or a sheet metal portion 77 of the automobile body.

To mount the weather strip 61 on the automobile body flange 71, an adhesive seal band 79 is formed by charging a seal material into the groove formed in the trim portion 63 at the innermost portion thereof. The adhesive seal band 79 seals a gap between the groove in trim portion 63 and the automobile body flange 71 not only to supplement the sealing function of the fin seal portion 67 and the clamp lips 69, but also to prevent rusting of the edge of the automobile body flange 71.

In order to increase the flexibility, and hence sealability of the above-mentioned elastic seal material, it has been proposed to use corking materials (sealants) that are amorphous and come into contact with any shape (see Japanese Utility Model Application No. 104412/1977). In addition, a viscous elastic seal material has been used and is disclosed in Japanese Utility Model Unexamined Publication No. 65209/1980 and Japanese Utility Model Examined Publication No. 31877/1986.

However, it has been found from a study conducted by the inventors that when the trim for an automobile utilizes an amorphous sealant such as described above, the following problems exist.

First, the amorphous sealant is so adhesive that much care and many process steps are involved during formation. For example, the sealant must be carefully forced out of its container and the releasable nozzle of the application gun must be carefully directed in order to avoid excessive and incorrect adhesion. The same problem is similarly encountered by the elastic seal materials.

Second, to ensure sealability, the amount of sealant charged into the groove inner portion of the trim portion must be a value larger than a predetermined value while taking into account such factors as flange height and trim assembling variations. This has made it difficult to speed up the sealant charging operation.

Third, the seal band 79 formed on the inner groove is prone to fall off the trim portion.

SUMMARY OF THE INVENTION

The invention has been made in view of the above circumstances. Accordingly, a first object of the invention is to provide a seal structure for a weather strip capable of meeting the requirement of having a high degree of sealability.

A second object of the invention is to provide a method of forming a seal structure for a weather strip which has a high degree of sealability without increasing the number of process steps.

A third object of the invention is to provide a trim for an automobile body capable of overcoming all of the above-mentioned problems.

To achieve the first object, the invention utilizes an elastic seal member formed from a foamable elastic sealant.

To achieve the second object, a method for forming such seal structure includes the steps of applying a material of the sealant to an area of the weather strip by an application gun and hardening the material of the sealant thereat. The material of the sealant is in a fluid state with a pressurized inactive gas being mixed therewith. The sealant is applied to the area on the weather strip where the gap is supposed to be formed.

To achieve the third object, the invention provides a trim for an automobile body which not only has an inverted U-shaped section with confronting clamp lips formed therein, but also has an adhesive seal band formed by charging a sealant into a groove bottom portion thereof with a charging gun. In such a trim, the sealant is not initially adhesive at the early stage of its application and is a foamable sealant which foams after being applied from the charging gun.

DETAILED DESCRIPTION OF THE PREFERRED EMBODIMENTS

Embodiments of the invention will now be described with reference to the accompanying drawings. The same parts and components as those of the conventional example are designated by the same reference characters.

Figure 4:
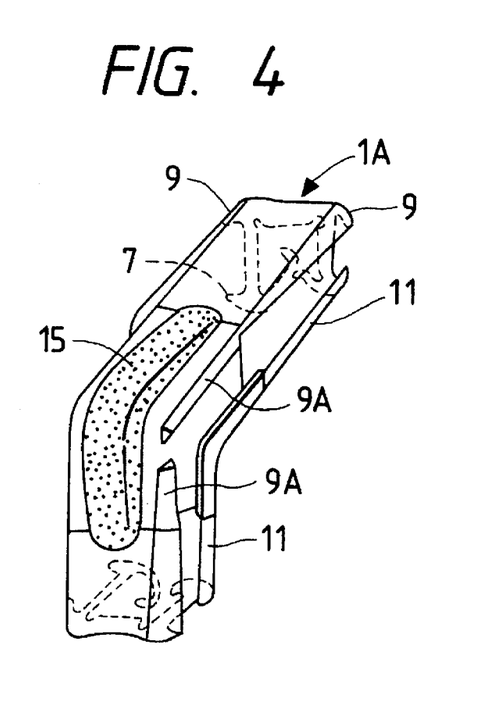
FIG. 4 is a perspective view showing an exemplary seal structure for a weather strip (glass run) of the present invention at a corner portion.

The embodiment shown in FIG. 4 is a seal structure to be applied to a corner portion C1 at a joint between a door sash 3 and a vertical frame 5 for a side-view mirror bracket in a door glass run 1, which is the same as in the conventional example. More specifically, and with reference to FIGS. 1 and 3, the embodiment applies to a structure for elastically sealing a gap formed between the confronting surfaces of the joint (between the door sash 3 and the vertical frame 5 for the mirror bracket, which are metal plate portions of the automobile body) and the glass run 1 (which is a weather strip).

In this embodiment, a foamable elastic sealant is used as the elastic seal material 15, which is a material different from that used in the conventional example. The sealant here is not only a material which is fluid or fluidizable before application and which can be applied from an application gun in a selected length, width, and thickness, but is also a material that can seal a gap between structures and hardened after application. The reason the sealant is limited to foamable elastic materials is that a sealant will not have the requisite flexibility to go along with the metal plate portions of the automobile body, etc. after hardening unless the sealant is foamably elastic. As long as the sealant has a satisfactory flexibility as a seal, the material is not particularly limited; however, a material having an expansion ratio of 1 to 4 and a compressive hardness of 0.2 kg/cm$^2$ or less is usually used. Whether the material has surface viscosity after hardening does not matter.

Whether foams are independent or continuous in form in a foaming mode also does not matter. In addition, the hardening mode whether it is by oxygen/moisture hardening, solvent volatilization, chemical reactions, or heat-melt-cool-solidify processes, etc. does not matter. Among these seal materials, a hot melt sealant (described later), which is a type of sealant subjected to a heat-melt-cool solidify process and which can be used by dissolving an inactive gas under pressure, is desirable from the viewpoint of material stability as well as application performance after hardening. No solvent is used in hardening the hot melt sealant.

An olefin-based thermoplastic elastomeric TPE hot melt sealant is preferably used.

Since the elastic seal member 15 is made of a foamable elastic sealant as described above, the profile in which the elastic seal material 15 is applied can be arbitrary in terms of width, length, and height as shown in FIG. 4. In addition, there is no step performed which causes a sharp change in height, etc. of the applied seal material as is the case with the conventional example. Thus, sealability is improved.

A method of forming the above-mentioned seal will be described by referring to a case where the seal is formed by using a hot melt sealant applicator.

If a microcomputer control mechanism is built in this applicator and if data such as application length, thickness, width, or the like of the sealant are input into a microcomputer in advance, then a stable application of sealant to form a desired designed profile can be effectively automated, thus facilitating the robotization of the sealant applying operation.

Figure 5:
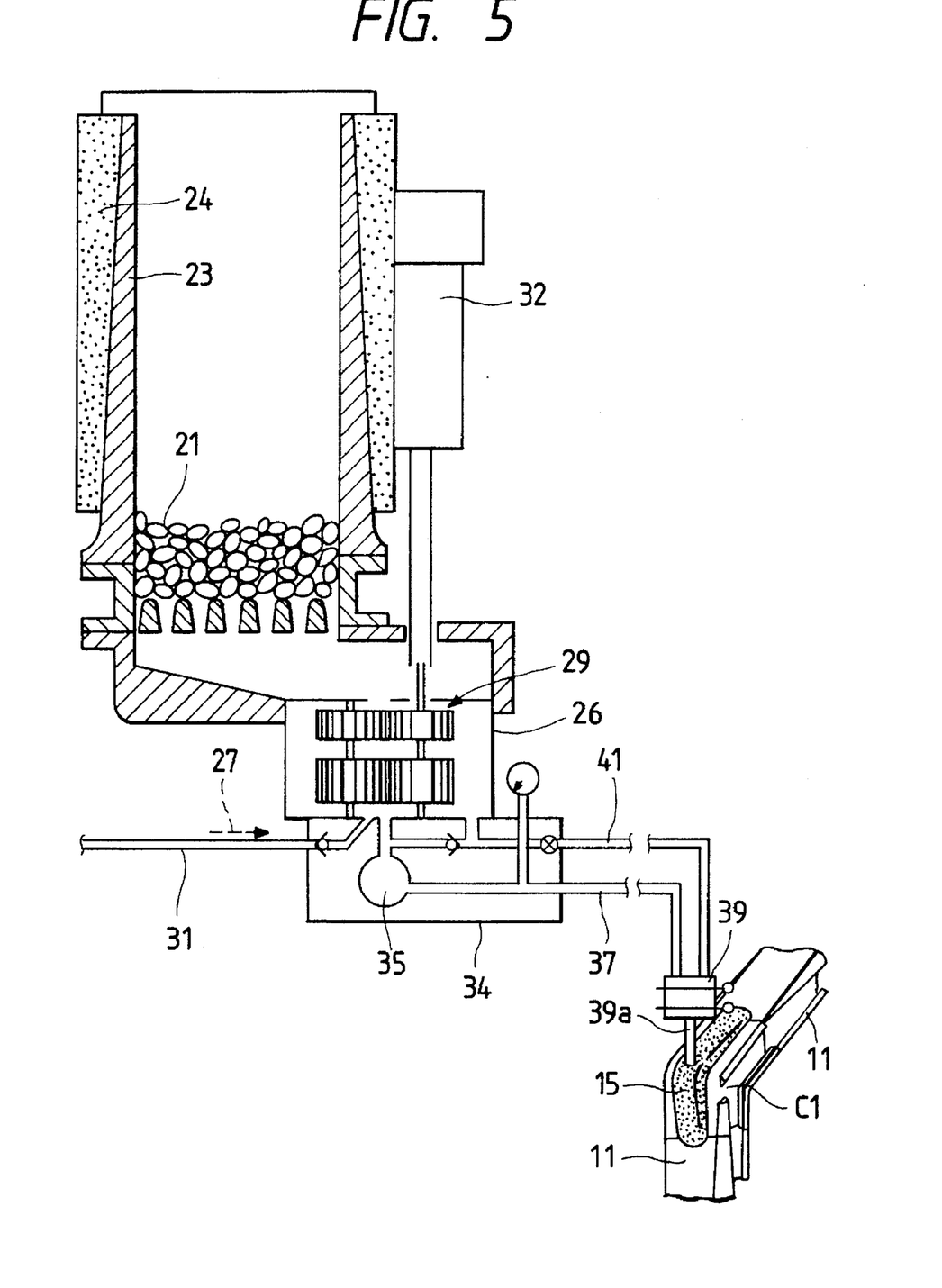
FIG. 5 is a schematic sectional view showing an exemplary hot melt sealant applicator used in forming a seal structure for a weather strip of the present invention.

As can be seen in FIG. 5, a hot melt sealant 21 is provided to a warm hopper 23 in a predetermined amount, and is heated and melted. The outer periphery of the warm hopper 23 is covered with an insulating member 24.

The heated and melted sealant 21 enters into a reservoir 26 by its own weight. In the reservoir, an inactive gas (carbon dioxide, nitrogen, etc.) flows in a direction indicated by numeral 27 and is mixed with and dissolved into the sealant 21 by a gear pump 29. The inactive gas is blown into the reservoir 26 from bottom by a gas supply pipe 31 connected to a gas tank (not shown). The gear pump 29 is driven by a motor 32 or the like.

The gas dissolved sealant is supplied into a manifold 34, and is then sent to a supply side hose 37 while maintaining the gas-to-sealant ratio at a predetermined value.

The gas dissolved sealant is expelled out of a nozzle 39a by an application gun 39 mounted on the front end of the supply side hose 37 to apply the sealant to a predetermined area of the glass run 1, i.e., to a predetermined area of the back surface of the corner portion C1 and to a predetermined thickness. Any superfluous portion of the gas dissolved sealant is returned to the manifold 34 through a return side hose 41.

The gas dissolved sealant discharged into the atmosphere is hardened by being cooled. At the same time, a great number of bubbles are produced within the sealant since the pressurized inactive gas that is in a dispersed state becomes expanded to cause the sealant to foam.

The door glass run (weather strip) 1 with the sealant applied thereon is thus assembled with the door sashes 3 and 5 in a manner similar to the conventional example. The profile of the elastic seal member 15 defined by the application of sealant is such that the gap formed between the confronting surfaces of the glass run 1 and the door sashes (the metal plate portions of the automobile body) 3 and 5 is completely sealed. Since there is no step creating a drastic change in height, sealability is improved.

Figure 1:
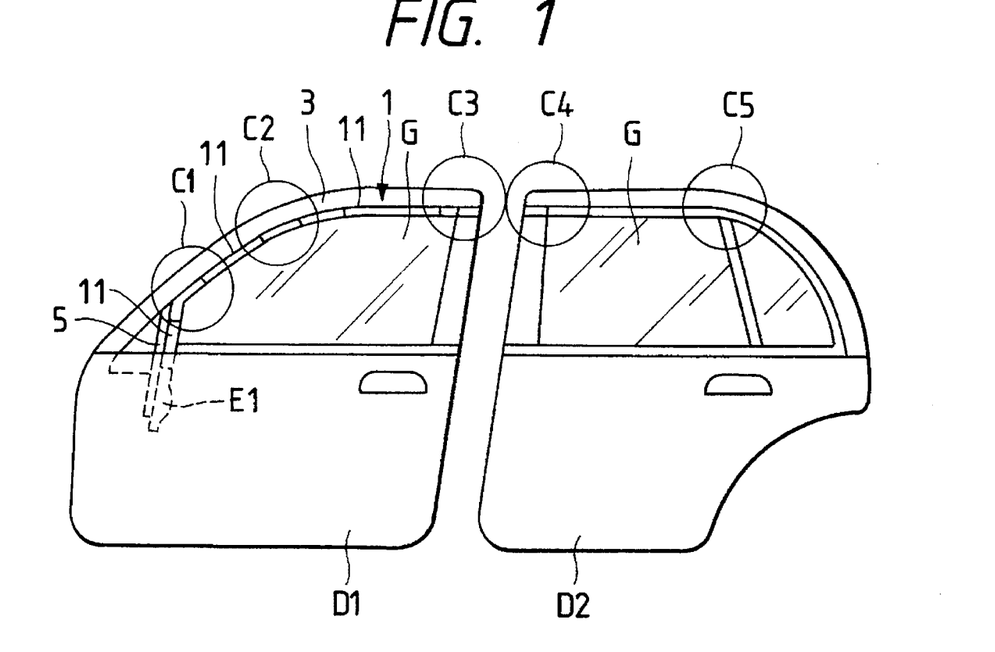
FIG. 1 is a front view of doors of an automobile and shows the locations to which a seal structure for a weather strip of the present invention is applied.

While the example in which the sealing of the corner portion C1 at the joint between the door sash 3 and the vertical door mirror frame 5 of the door glass run 1 has been described in the above embodiments, the same can be applied to other corner portions C2, C3, C4, and C5 as well as to an end portion E1 in the front door D1 or the rear door D2 (see FIG. 1).

Figure 6:
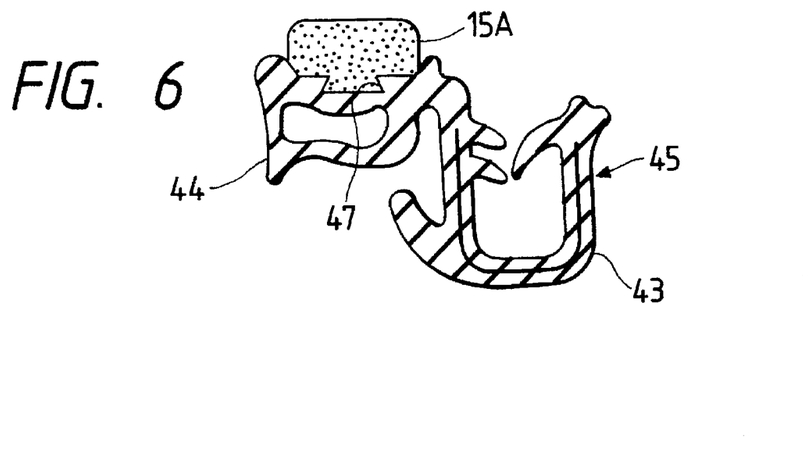
FIG. 6 is a sectional view showing another example to which a seal structure for a weather strip of the present invention is applied.

Further, in addition to the corner portions, the embodiments of the invention can be applied to linear portions, such as a door weather strip (roof side weather strip) 45 whose section includes a U-shaped clamp portion 43 and a hollow seal portion 44 such as shown in FIG. 6. Still further, if a problem exists in the bonding property (adhesion) between an elastic seal member 15A, i.e., a foamable elastic sealant and the weather strip 45, then an undercut groove 47 that has an anchoring effect may preferably be formed. If there is no problem with adhesion, the sealant may be applied to the bottom surface only.

Figure 7:
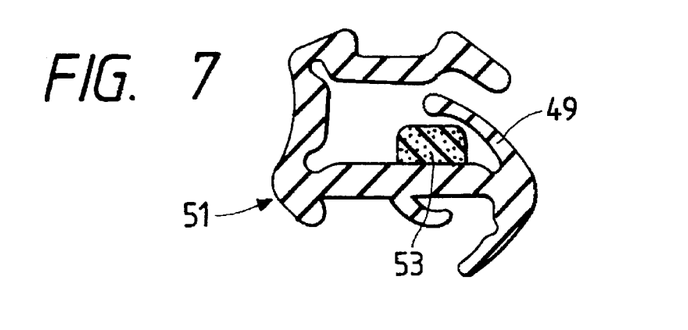
FIG. 7 is a sectional view showing an example application of the present invention in which a foamable elastic sealant is used for reinforcing the side surfaces of a weather strip.

Still further, a foamable elastic sealant 53 used in the invention may be applied to the inside of a seal lip 49 as shown in FIG. 7, so that the biasing force onto the door glass of the seal lip 49 is increased. Such an application for the sealant is aimed at preventing flapping of the door glass in the vicinity of the corner portions of the door belt line or upper end corner portions of a glass run 50 having the bent seal lip 49 on the inner side of member 51 at a portion thereof disposed on the outer side of an automobile.

The seal structure for a weather strip of the present invention is characterized by forming an elastic seal member for sealing a gap with a foamable elastic sealant. As a result, the elastic seal member has a profile which corresponds to the gap in length, width, and height (particularly, height) and can be formed extremely easily as compared to a conventional sponge sheet. In addition, a high degree of sealability is achieved.

Additionally, the method of forming the seal structure of the invention is characterized by forming an elastic seal member while applying a fluid sealant material mixed with pressurized non-reactive gas to a surface on the weather strip where the gap is to be formed by using an application gun and hardening the sealant material thereat. As a result, a seal structure with high sealability can be formed without increasing the process steps as compared to the conventional method using a sponge sheet. Still further, if data such as the length, width, and thickness of sealant to be applied are input into a microcomputer in advance by using a microcomputer control mechanism, then automatic, stable application is possible, thereby facilitating the robotization of the sealant applying operation.

Another embodiment of the invention will now be described with reference to the accompanying drawings. The same parts and components as those of the conventional example are designated by the same reference characters.

This embodiment relates to the weather strip 61 (shown in FIG. 8) for an automobile trunk, the construction of which is the same as that of the conventional example. The weather strip 61 includes: an inverted U-shaped trim portion 63, a hollow seal portion 65 formed on the apex of the trim portion 63, and a fin seal portion 67 formed on the outer side surface of the trim portion 63. The weather strip is fabricated by extrusion, molding, or the like.

As a sealant for forming the adhesive seal band 79, a foamable sealant which is initially non-adhesive and has an expansion ratio of 3 to 7 is used. The sealant is foamed after expulsion by a charging gun.

The reason the sealant is foamed after having been expelled from the charging gun is to reduce a solid amount of sealant charged (i.e., the amount of sealant discharged from the charging gun) and thereby enhance the speed of the charging operation.

Since the sealant initially has no adhesiveness (i.e., before it is foamed), the handling and workability of the sealant is increased. This, of course, contributes to an increase in sealability and in preventing the seal structure from falling off the flange because the sealant becomes adhesive after it is discharged and foamed.

The reason it is preferred for the expansion ratio to be about 3 to 7 is that a lower expansion ratio would be unable to decrease the solid amount of charged sealant, decrease the pushing load, and increase the charging speed. At the same time, it would be disadvantageous to have a higher expansion ratio since it would then be difficult to obtain proper strength and sealability as well as an increase in the falling load relative to the flange.

Whether the foams are pure or a mixture of foam with another substance does not matter. The type of hardening, whether it be oxygen/moisture hardening, solvent volatilization, chemical reaction, or heat-melt-cool-solidify processes, does not matter either.

In order to meet the above requirements, it is preferable to use a hot melt sealant (described later), which is a type of sealant which is processed and hardened by a heat-melt-cool-solidify procedure and which is prepared by dissolving an inactive gas under pressure. This hot melt sealant is also preferred from the viewpoint of material stability as well as application performance after non-solvent based hardening. The hot melt sealant is most preferably a low viscous and highly adhesive type sealant containing a synthetic rubber or hot melt adhesive consisting mainly of an olefin-based polymer. A rust preventative may be contained in an appropriate amount in the above sealants.

Figure 9:
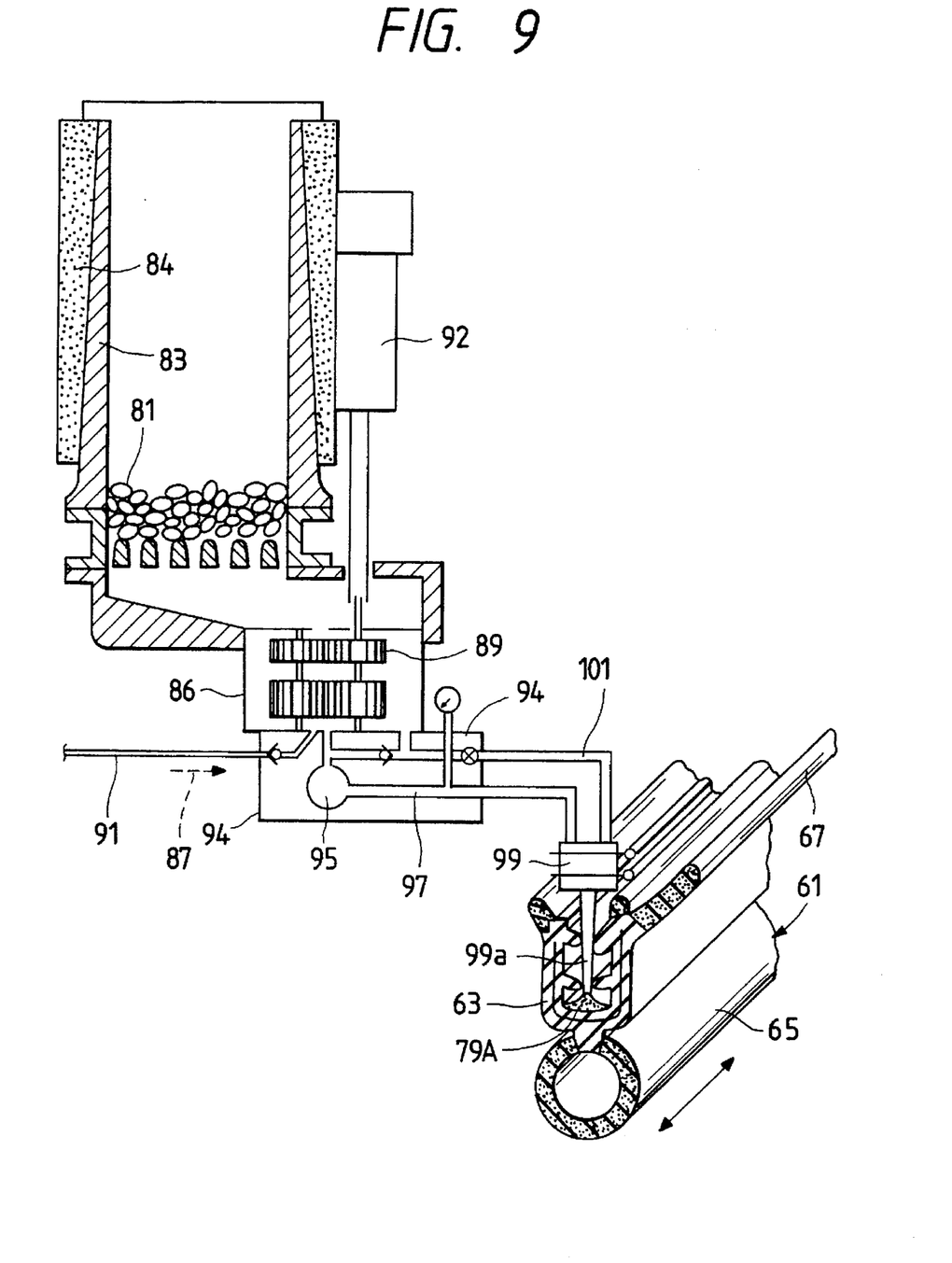
FIG. 9 is a schematic sectional view showing an exemplary hot melt sealant applicator used in forming an adhesive seal band of a trim of the present invention.

Next, in conjunction with FIG. 9, a method of forming an adhesive seal band 19A by charging the sealant into the groove innermost portion of the trim portion using a hot melt sealant applicator will be described.

The sealant charging operation can be robotized by assembling a microcomputer control mechanism into the sealant applicator. By inputting data, such as the amount of sealant to be used, into a microcomputer, an automatic and stable sealant charging operation is possible.

A hot melt sealant 81 is charged into a warm hopper 83 in a predetermined amount, and is heated so as to be melted. The outer periphery of the warm hopper 83 is covered with an insulating material 84.

The heated and melted sealant 81 enters into a reservoir 86 by its own weight. In the reservoir, an inactive gas (carbon dioxide, nitrogen, etc.) travels through pipe 91 in a direction indicated by the arrow 87 and is mixed with and dissolved into the sealant 81 by a gear pump 89. The gas supply pipe 91 is connected to a gas tank (not shown). The gear pump 89 is driven by a motor 92 or the like.

The gas dissolved sealant is provided to a manifold 94 and sent to a supply side hose 97 while maintaining the ratio of gas to sealant constant.

The gas dissolved sealant is dispensed from a nozzle 99a by a charging gun 99 mounted on the front end of the supply side hose 97 to thereby charge the sealant to a predetermined height at the innermost portion of the groove in the trim portion 63. Any superfluous portion of the gas dissolved sealant is returned to the manifold 94 through a return side hose 101.

The gas dissolved sealant discharged into the atmosphere is hardened by being cooled. At the same time, since the pressurized inactive gas is expanded, a great number of bubbles are produced in the sealant, thereby causing the sealant to be foamed and to form the adhesive seal band 79A. In this case, although the amount of sealant dispensed is small, the apparent amount of charged sealant is large. This means that the amount of sealant charged (by weight) can be saved to a significant degree. Data such as dissolved gas amounts and pressure conditions are adjusted so that the expansion ratio can be set to 3 to 7.

The weather strip 61 is mounted on the automobile body by fitting the trim portion on which the adhesive seal band 79A has been formed onto the flange portion from outside. During this operation, since the adhesive seal band 79A has an expansion ratio as high as 3 to 7, the pushing load is small. After pushing, the adhesiveness of the sealant is effective in preventing the trim portion from falling off the automobile body flange 71.

While the example of the weather strip for trunks has been described in the above embodiment, the invention is applicable to other weather strips, e.g., for sealing inner boards, roof sides, and quarter window weather strips.

The trim for the automobile body of the invention has an inverted U-shaped section with confronting clamp lips therein. When the seal band is formed by charging the sealant into the innermost portion of the groove, the sealant is initially unadhesive as the sealant is still a raw material and then transformed into a foamable sealant with an expansion ratio of 3 to 7 after having been dispensed from the charging gun. As a result, the following advantages can be obtained.

Since the sealant is unadhesive, as it is a raw material before being used as an applying agent, it is easy to handle. Compared with the conventional case in which an elastic seal material or an amorphous sealant which is highly adhesive as a raw material, not only is handling easier, but so is mechanization and application of the adhesive because it is unnecessary to be extra careful to avoid adhesion of the sealant to unwanted locations.

Since the sealant foams after having been dispensed from the charging gun, the amount of sealant charged can be saved in comparison with the amount charged in the conventional case. Together with the advantage of simplified handling at the stage of the sealant's being a raw material, the charging operation can be performed more quickly.

Since the expansion ratio is as high as 3 to 7, the load required to push the trim portion onto the automobile flange is reduced compared with the conventional case.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A sealing component for an automobile body comprising:

an elongated weather strip for an automobile body including, at spaced apart locations, an applied additional L-shaped elastic seal member, adapted to seal a gap between an exterior surface of a corner portion of said weather strip and an adjacent portion of the automobile body on which said weather strip is to be mounted, said elastic seal member being formed from a foamable elastic sealant material, said elastic seal member being shaped with a thick portion at a bend area with the remainder of the elastic seal member progressively tapering toward thinner portions beyond said bend area for fitting in a joint between a door sash of the automobile body and a vertical frame for a side-view mirror bracket of the automobile, wherein said foamable elastic sealant has an expansion ratio of 1 to 4 and a compressive hardness of up to and including about 0.2 kg/cm$^2$.

2. A sealing component according to claim 1, wherein said foamable elastic sealant is an olefin-based TPE hot melt sealant.

3. A sealing component according to claim 1, including said weather strip with a U-shaped clamp portion including a linear section, said elastic seal member being disposed on said linear section of said U-shaped clamp portion.

4. A sealing component according to claim 3, wherein an undercut groove is formed in said linear section and said elastic seal member is disposed in said undercut groove.

5. A sealing component according to claim 1, including said weather strip which includes a trim portion having a U-shaped section and opposing inner clamp lips formed therein, said U-shaped section having an groove formed therein, said elastic seal member being disposed within said groove.

6. A sealing component for an automobile body comprising:

a weather strip; and an elastic seal member, adapted to seal a gap between said weather strip and a portion of the automobile body on which said weather strip is adapted to mounted, said elastic seal member being formed from a foamable elastic sealant and positioned along limited portions of said weatherstrip, wherein said foamable elastic sealant has an expansion ratio of 1 to 4 and a compressive hardness of about 0.2 $kg/cm^2$ or less.

7. A sealing component according to claim 6, wherein said foamable elastic sealant is an olefin-based TPE hot melt sealant.

* * * * *